United States Patent
Namikoshi et al.

(10) Patent No.: US 7,859,166 B2
(45) Date of Patent: Dec. 28, 2010

(54) CARBON BRUSH PRODUCED BY MIXING A CARBONACEOUS FILLER AND A BINDER, AND KNEADING, SHAPING, AND BAKING THE MIXTURE

(75) Inventors: Daisuke Namikoshi, Saita-cho (JP);
Fumihiro Hozumi, Saita-cho (JP);
Shinichi Suzuki, Saita-cho (JP);
Takahiro Sakoda, Saita-cho (JP)

(73) Assignee: Totankako Co., Ltd., Toyonaka-shi (JP)

( * ) Notice: Subject to any disclaimer, the term of this patent is extended or adjusted under 35 U.S.C. 154(b) by 255 days.

(21) Appl. No.: 11/572,581

(22) PCT Filed: Mar. 24, 2005

(86) PCT No.: PCT/JP2005/005321

§ 371 (c)(1),
(2), (4) Date: Feb. 13, 2007

(87) PCT Pub. No.: WO2006/011267

PCT Pub. Date: Feb. 2, 2006

(65) Prior Publication Data

US 2008/0303373 A1    Dec. 11, 2008

(30) Foreign Application Priority Data

Jul. 26, 2004    (JP)    ............... 2004-216811

(51) Int. Cl.
*H01R 39/26* (2006.01)
*H02K 13/00* (2006.01)
*H01R 39/18* (2006.01)
*H01R 39/20* (2006.01)
*H01R 39/06* (2006.01)
*H01R 43/12* (2006.01)

(52) U.S. Cl. ............... 310/251; 310/248; 310/252; 310/253; 439/11; 439/13; 439/18

(58) Field of Classification Search ............... 310/253, 310/252, 248, 249, 251; 252/502, 503, 504, 252/506, 509, 510, 511, 515; 439/11, 13, 439/18; *H01R 39/18, 39/20, 39/26, 39/06, H01R 43/12; H02K 13/00*
See application file for complete search history.

(56) References Cited

U.S. PATENT DOCUMENTS 3,063,947 A * 11/1962 Krellner ............... 310/253

(Continued)

FOREIGN PATENT DOCUMENTS

JP    56 160783    12/1981

(Continued)

OTHER PUBLICATIONS

Second Office Action issued in CN200580025076.9 (w/English Translation).

(Continued)

*Primary Examiner*—Quyen Leung
*Assistant Examiner*—Michael Andrews
(74) *Attorney, Agent, or Firm*—Oblon, Spivak, McClelland, Maier & Neustadt, L.L.P.

(57) ABSTRACT

A carbon brush that suppresses a wear amount of a carbon commutator and has less swelling is provided. The carbon brush has a part connected to a lead and is one that slides in contact with a carbon commutator that is used in a fuel pump. The bulk density of the carbon brush is 1.85 g/cm$^3$ or less, and the shore hardness of the carbon brush is 40 or less.

6 Claims, 4 Drawing Sheets

U.S. PATENT DOCUMENTS

| | | | | |
|---|---|---|---|---|
| 3,284,371 | A | * | 11/1966 | Krellner ................... 310/253 |
| 3,719,608 | A | * | 3/1973 | Olstowski ................. 252/506 |
| 4,534,887 | A | * | 8/1985 | Broady et al. ............. 252/503 |
| 4,799,957 | A | * | 1/1989 | Vogel ....................... 310/253 |
| 4,929,404 | A | * | 5/1990 | Takahashi et al. ......... 264/29.5 |
| 5,744,892 | A | * | 4/1998 | Mukai et al. .............. 310/251 |
| 2001/0025014 | A1 | | 9/2001 | Vesper et al. |
| 2003/0155837 | A1 | * | 8/2003 | Takahashi et al. ......... 310/253 |

FOREIGN PATENT DOCUMENTS

| | | |
|---|---|---|
| JP | 59-106854 | 6/1984 |
| JP | 6 189506 | 7/1994 |
| JP | 8 308183 | 11/1995 |
| JP | 8 126259 | 5/1996 |
| JP | 10 162923 | 6/1998 |
| JP | 11 246681 | 9/1999 |
| JP | 2000 208224 | 7/2000 |
| JP | 2000208224 A * | 7/2000 |
| JP | 2001-008416 | 1/2001 |
| JP | 2004 124224 | 4/2004 |

OTHER PUBLICATIONS

Office Action issued Jun. 29, 2010, in Korean Patent Application No. 10-2006-7027871, filed Dec. 29, 2006 (with English-language Translation).

Office Action issued Sep. 30, 2010, in Korean Patent Application No. 10-2006-7027871, filed Dec. 29, 2006 (with English-language Translation).

* cited by examiner

CARBON BRUSH PRODUCED BY MIXING A CARBONACEOUS FILLER AND A BINDER, AND KNEADING, SHAPING, AND BAKING THE MIXTURE

TECHNICAL FIELD

The present invention relates to a carbon brush that is used when it slides to commutate in contact with carbon commutator, for instance, a carbon brush that is used in a strongly corrosive liquid such as gasoline or the like in a fuel pump.

BACKGROUND ART

In a modern society, transportation devices such as automobiles having a combustion engine are inevitable. As a fuel pump of the automobile or the like, a lot of electromagnetic driving fuel pumps that incorporates a motor portion and a pump portion are used.

A principle of the electromagnetic driving fuel pump is as follows. When a contact portion of a commutator of the motor portion comes into contact with a brush, an electric current is supplied from a power source to an armature to rotate the armature. When the armature is rotated, an impeller of the pump portion is rotated to pump fuel from a fuel tank to supply it to an engine.

In general, a commutator that is used in a fuel pump like this is in many cases made of copper.

However, there is a problem in that, since a copper commutator is oxidized or exposed to gasoline or the like containing sulfur or an alcoholic component, the commutator per se is likely to be corroded.

In this connection, in recent years, in place of the copper commutator, carbon commutators shown in patent literatures 1 through 3 below are proposed.

Patent literature 1: JP-A-8-126259

Patent literature 2: JP-A-8-308183

Patent literature 3: JP-A-10-162923

DISCLOSURE OF INVENTION

Problems that the Invention is to Solve

Normally, since a copper commutator is harder than a carbon commutator, when a carbon brush for use in copper commutator is applied as it is in a carbon commutator, only a wear amount of the carbon commutator increases.

Furthermore, although the carbon commutators are proposed in the respective patent literatures, as to the carbon brush that slides in contact with the carbon commutator, it is only disclosed that a commutator piece and a carbon brush had better be made of the same material. That is, only a slight attention is paid to a carbon brush where a wear amount of the carbon commutator is slight.

Still furthermore, a carbon material that constitutes the carbon commutator and carbon brush is a porous material that has a lot of pores. Accordingly, since the carbon commutator and carbon brush are under an atmosphere always exposed to gasoline that is a fuel or the like, there is a problem in that the carbon commutator and carbon brush per se are swelled to be fastened against a brush holder.

In this connection, the invention intends to provide a carbon brush that can suppress a wear amount of a carbon commutator and is less swelled.

Means for Solving the Problem

A carbon brush of the invention is a carbon brush that slides in contact with a carbon commutator that is used in a fuel pump. The bulk density of the carbon brush is 1.85 g/cm$^3$ or less and preferably in the range of 1.60 to 1.75 g/cm$^3$, and the shore hardness thereof is 40 or less and preferably in the range of 30 to 40. In the carbon brush according to the invention, the swelling rate in a layer direction when it is immersed in gasoline at 30° C. for 2000 hr is 0.2% or less and preferably 0.1% or less. Furthermore, the carbon brush of the invention is preferably produced in such a manner that one constituted of carbonaceous filler containing graphite powder and cokes and a binder is molded and heat treated. Still furthermore, the binder is preferably one selected from coal tar pitch, pitch and a thermosetting resin. Furthermore, the carbon brush of the invention is preferably formed further containing talc.

ADVANTAGE OF THE INVENTION

The carbon brush according to the invention has the bulk density of 1.85 g/cm$^3$ or less and the shore hardness of 40 or less. Accordingly, the carbon brush that can suppress the wear amount of the carbon commutator and is less swelled can be obtained.

BEST MODE FOR CARRYING OUT THE INVENTION

In what follows, an example of an embodiment of a carbon brush involving the invention will be specifically described with reference to the drawings.

A carbon brush 11 involving the invention has a shape as shown in, for instance, FIG. 4 and a lead is connected to a part thereof. The carbon brush 11 has the bulk density of 1.85 g/cm$^3$ or less and preferably in the range of 1.60 to 1.75 g/cm$^3$ and the shore hardness of 40 or less and preferably in the range of 30 to 40. Furthermore, the swelling rate of the carbon brush 11 in a layer direction when it is immersed in gasoline at 30° C. for 2000 hr is 0.2% or less and preferably 0.1% or less. Still furthermore, the carbon brush 11 is produced in such a manner that one constituted of carbonaceous filler containing graphite powder and cokes and a binder is molded and heat treated. Furthermore, the binder is one selected from coal tar pitch, pitch and a thermosetting resin. Still furthermore, the carbon brush 11 may contain 0.1 to 10% by weight of an additive agent such as talc, MoS$_2$ (molybdenum disulfide), WS$_2$ (tungsten disulfide) or the like to impart the self-lubricity.

The commutator 1 is constituted, as shown in FIGS. 1 and 2, of 8 segments 2 segmented at an equiangular interval and a resin support that supports the segments 2. Each of the segments 2 includes a contact portion 4 and a copper terminal portion 5 that is in contact electrically with the contact portion 4. Since grooves that separate the respective segments 2 reach the support 3, the respective segments 3 are electrically insulated from each other. A nail portion 5a projects toward a periphery of each of the terminal portions 5 to come into contact electrically with a coil.

The commutator 1 thus constituted is produced as follows.

In the beginning, an end face of the contact portion 2 that comes into contact with the terminal portion 5 is plated with nickel followed by soldering a nickel surface and the terminal portion 5. The terminal portion 5 is made of a copper disc having nail portions 5a along an outer periphery and the contact portion 2 is constituted of filler of which main component is cokes and a binder, the binder being carbonized. A resin mold is applied to the terminal portion 5 to form a support 3, the contact portions 2 and the terminal portions 5 are divided to reach the support 3, and thereby the contact portions 62 and terminal portions 63 are formed. Thereafter, a coil is fused to nail portions 5a to electrically connect the contact portions 2 and the coil.

EXAMPLES

In what follows, with reference to examples 1 through 9 shown in Table 1 below, the invention will be specifically described.

having an average particle diameter of 10 μm and a predetermined weight percent of coal tar pitch (binder) were blended and kneaded. Kneaded one was pulverized once more, followed by molding into a predetermined shape, further followed by sintering, and thereby carbon brushes according to examples 8 and 9 were prepared.

Each of these was placed on a test machine shown in FIG. 3 to measure the wear rate of the carbon brush. Furthermore, each of the carbon brushes of examples, which were prepared according to the above-mentioned method, was immersed in gasoline at 30° C. for 2000 hr to measure as well the swelling

TABLE 1

|  | Cokes % by weight | Natural graphite powder % by weight | Talc % by weight | Binder Kind | Addition amount % | Wear rate of commutator mm/1000 h | Wear rate of brush mm/1000 h | Bulk density g/cm³ | Hardness Shore C | Resistivity μΩ·m | Bending strength MPa | Swelling rate (layer direction %) |
|---|---|---|---|---|---|---|---|---|---|---|---|---|
| Example 1 | 5 | 95 | — | Coal tar pitch | 30 | 0.19 | 0.83 | 1.82 | 28 | 88 | 25 | 0.05 |
| Example 2 | 10 | 90 | — | Coal tar pitch | 30 | 0.20 | 0.58 | 1.76 | 30 | 93 | 23 | 0.03 |
| Example 3 | 15 | 85 | — | Coal tar pitch | 30 | 0.20 | 0.42 | 1.72 | 31 | 93 | 20 | 0.02 |
| Example 4 | 20 | 80 | — | Coal tar pitch | 30 | 0.20 | 0.36 | 1.70 | 31 | 112 | 24 | 0.02 |
| Example 5 | 25 | 75 | — | Coal tar pitch | 30 | 0.30 | 0.34 | 1.68 | 32 | 118 | 17 | 0.02 |
| Example 6 | 30 | 70 | — | Coal tar pitch | 30 | 0.42 | 0.33 | 1.66 | 34 | 125 | 15 | 0.01 |
| Example 7 | 20 | 80 | — | Phenol resin | 15 | 0.30 | 0.36 | 1.62 | 21 | 82 | 11 | 0.19 |
| Example 8 | 20 | 80 | 0.5 | Coal tar pitch | 30 | 0.17 | 0.27 | 1.72 | 31 | 118 | 22 | 0.02 |
| Example 9 | 20 | 80 | 5 | Coal tar pitch | 30 | 0.18 | 0.26 | 1.72 | 30 | 115 | 22 | 0.03 |

*Average particle diameter: Cokes 10 μm, natural graphite powder 20 μm
*Binder: Pitch Examples 1 through 6

Carbon brushes according to examples 1 through 6 were prepared as follows. In the beginning, as shown in table 1, carbonaceous filler containing a predetermined weight percent of natural graphite powder having an average particle diameter of 20 μm and a predetermined weight percent of cokes having an average particle diameter of 10 μm and a predetermined weight percent of coal tar pitch (binder) were blended and kneaded. Kneaded one was pulverized once more, followed by molding into a predetermined shape, further followed by sintering, and thereby carbon brushes according to examples 1 through 6 were prepared.

Example 7

As shown in Table 1, a carbon brush of example 7, except that in place of coal tar pitch a predetermined weight percent of phenol resin was used, was prepared according to a manner similarly to that of example 4.

Examples 8 and 9

Carbon brushes according to examples 8 and 9 were prepared as follows. In the beginning, as shown in table 1, carbonaceous filler containing a predetermined weight percent of natural graphite powder having an average particle diameter of 20 μm and a predetermined weight percent of cokes rate in a layer direction. A measurement of the swelling rate was carried out of a thickness direction that is a layer direction of the carbon brush (FIG. 4). Specifically, with a thickness before immersion in gasoline as $L_0$ and a thickness after immersion in gasoline as $L_1$, from an equation of $((L_1-L_0)/L_0) \times 100(\%)$, the swelling rate was calculated.

The test machine shown in FIG. 3 is constituted of a motor 13 provided with a commutator 1 at a tip end, a carbon brush 11 in contact with the commutator 1 and a spring 12 energizing the carbon brush 11 to the commutator 1. The wear rate of the carbon brush, assuming that the carbon brush was actually used as a carbon brush for a fuel pump, was measured in an atmosphere of petroleum base mineral oil 14 under conditions below.

Number of rotations: 10000 min$^{-1}$

Commutator: φ 20 mm

Carbon brush: One having a shape and dimensions shown in FIG. 4

Current: D.C. 6A

Peripheral speed: 10 (m/s)

Furthermore, of the respective examples, the bulk density (g/cm³), hardness (shore C), resistivity (μΩ·m) and bending strength (MPa) were measured as well. The bulk density was calculated from (weight of carbon brush (g))/volume (cm³). Furthermore, the hardness was measured with a Shore-C hardness meter, the resistivity was measured according to a fall-of-potential method and the bending strength was measured with a material test machine.

From measurement results shown in Table 1, it was confirmed that the carbon brushes according to all examples are such low as 0.26 to 0.83 mm/1000 h in the wear rate thereof. Furthermore, it was as well confirmed that the wear rates of commutators that use a carbon brush according to each of examples are such low as 0.17 to 0.42 mm/1000 h. Still furthermore, it was as well confirmed that the swelling rate in a layer direction is 0.2% or less.

From these results, it is obvious that a carbon brush that can suppress a wear amount of the carbon commutator and is less swelling could be prepared.

The invention can be modified within a range that does not deviate from claims and is not restricted to the above-mentioned embodiments.

REFERENCE NUMERALS

Figure 1:
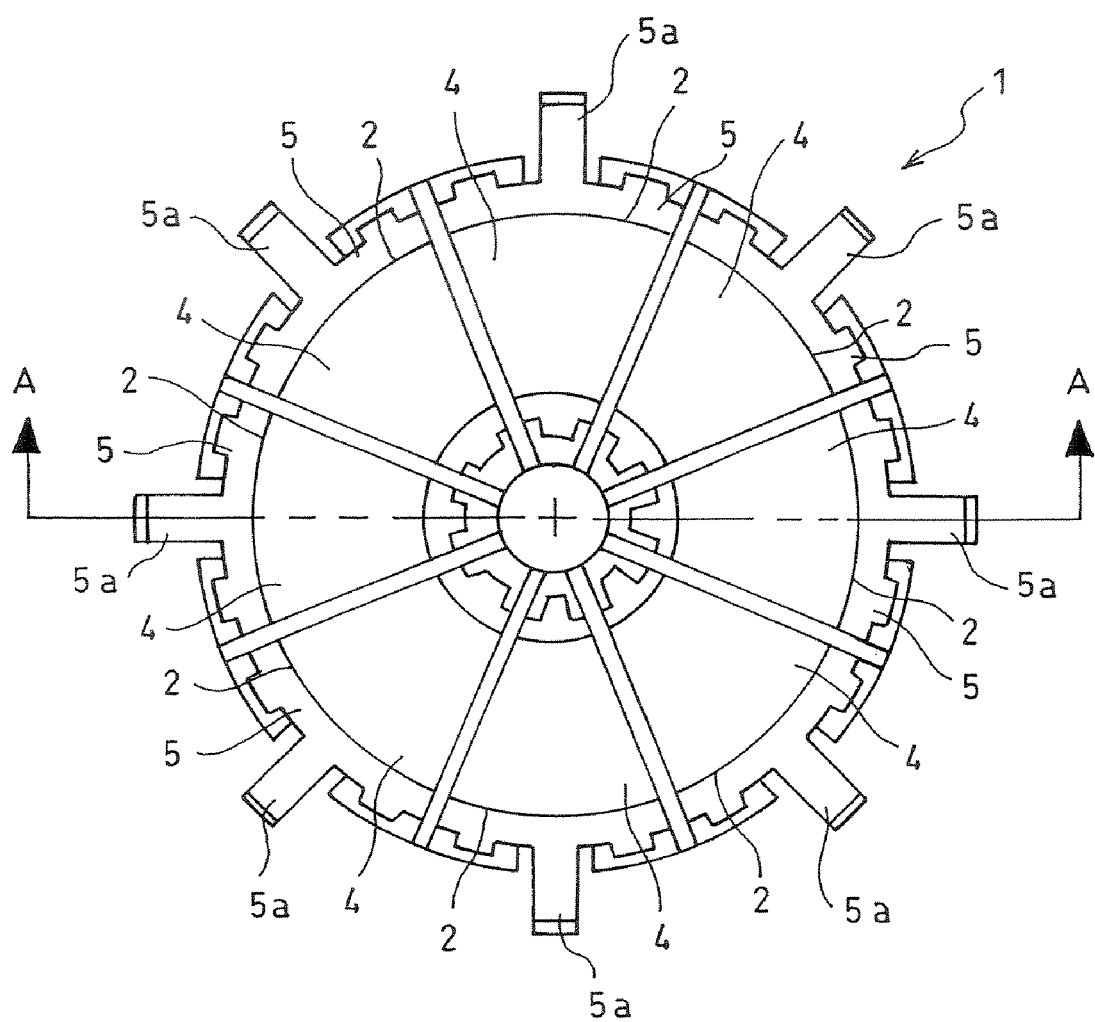
FIG. 1 is a diagram showing one example of a commutator that comes into contact with a carbon brush according to the invention.
Figure 2:
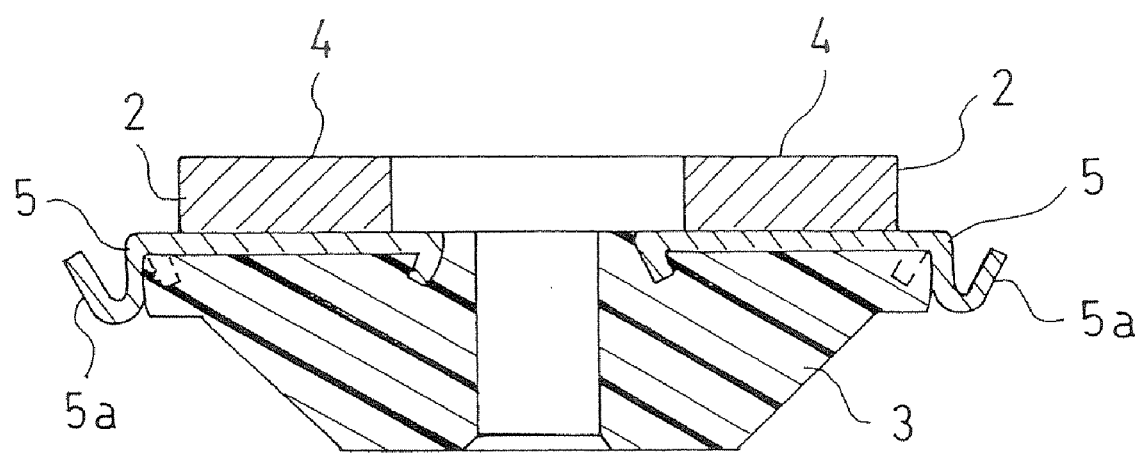
FIG. 2 is an A-A line sectional view in FIG. 1.
Figure 3:
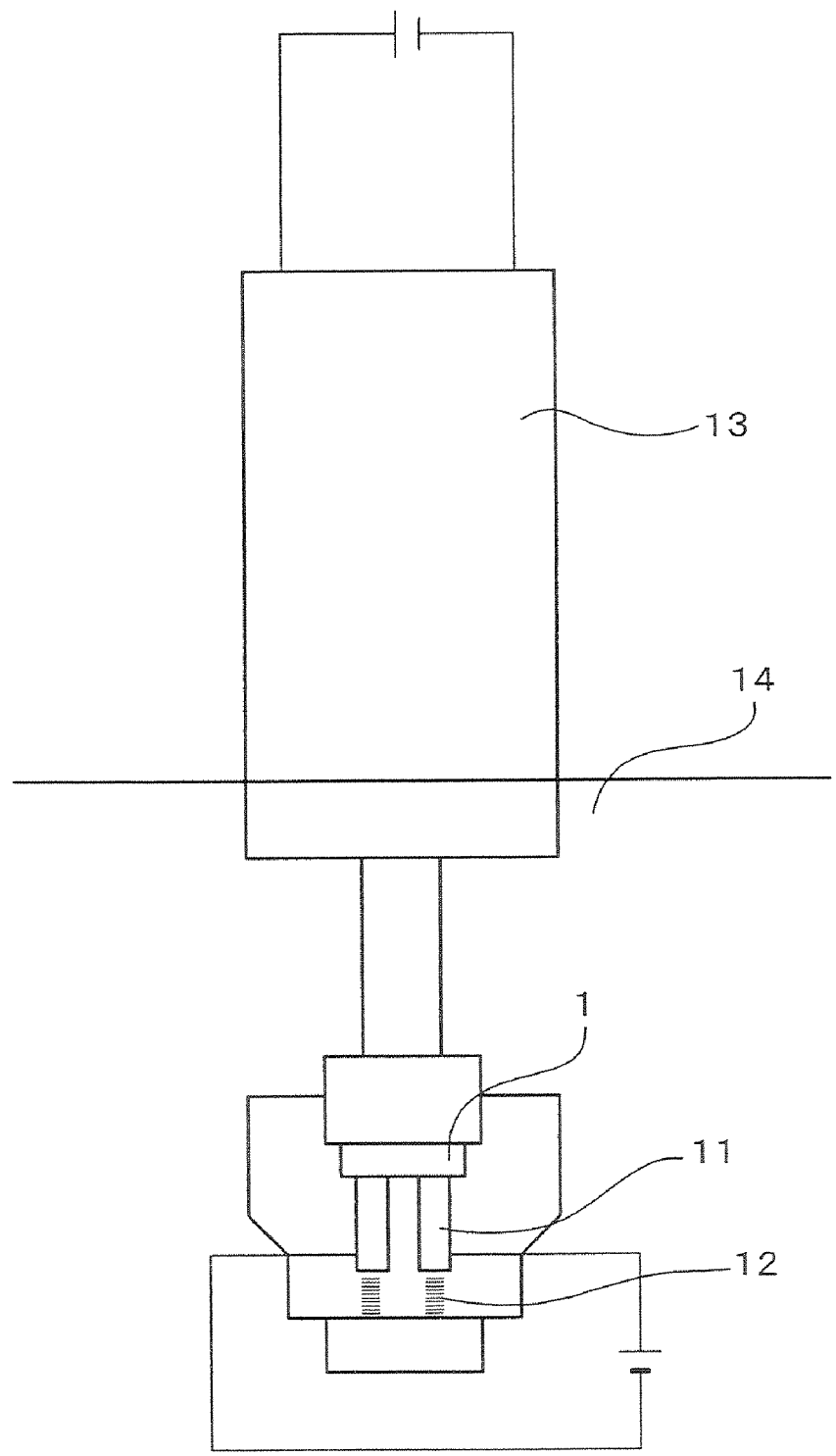
FIG. 3 is a schematic diagram of a test machine of a carbon brush involving the invention.
Figure 4:
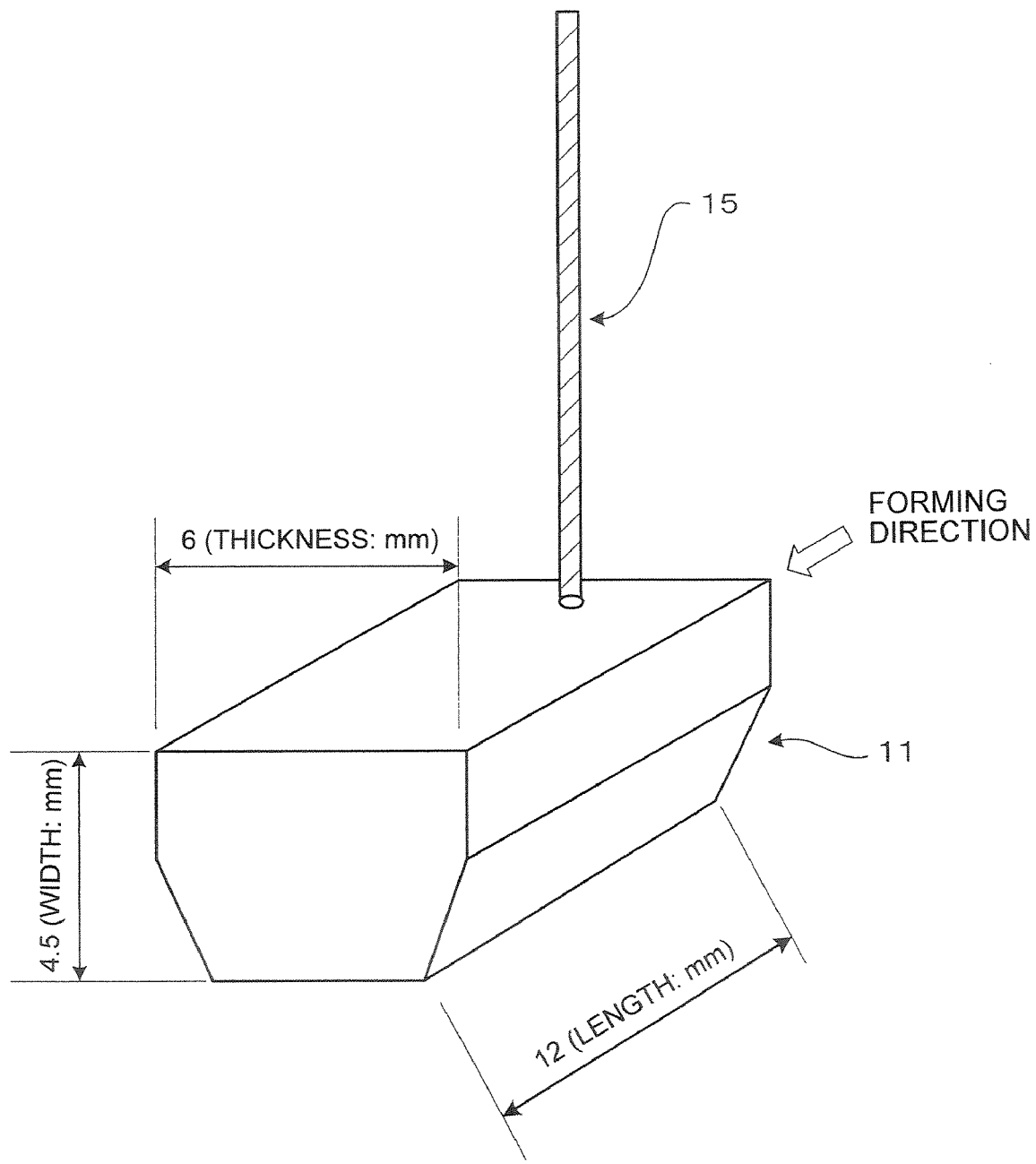
FIG. 4 is a perspective view of a carbon brush involving the invention.

1: commutator
2: segment
3: support
4: contact portion
5: terminal portion
5a: nail portion
11: carbon brush
15: lead

The invention claimed is:

1. A carbon brush produced by mixing a carbonaceous filler and a binder, and kneading, shaping, and baking the mixture, said carbon brush has a part connected to a lead and can slide in contact with a carbon commutator for a fuel pump, wherein:

the bulk density of the carbon brush is 1.62 to 1.82 g/cm$^3$ and the shore hardness of the carbon brush is 21 to 34;

the swelling rate in a layer direction when the carbon brush is immersed in gasoline at 30° C. for 2000 h is 0.19% or less;

the binder is at least one of coal tar pitch and a thermosetting resin; and the carbonaceous filler is a graphite powder and/or cokes.

2. The carbon brush according to claim 1, wherein the carbon brush comprises at least one additive agent selected from the group consisting of talc, molybdenum disulfide, and tungsten disulfide.

3. The carbon brush according to claim 2, wherein a content of the at least one additive agent is from 0.1 to 10 wt. % of the total weight of the carbon brush.

4. The carbon brush according to claim 1, wherein the swelling rate in a layer direction when the carbon brush is immersed in gasoline at 30° C. for 2000 h is 0.1% or less.

5. The carbon brush according to claim 1, wherein the carbonaceous filler is the graphite powder and is made of a natural graphite.

6. The carbon brush according to claim 1, wherein the carbonaceous filler comprises from 5 to 30 wt. % of cokes and from 70 to 95 wt. % of the natural graphite.

* * * * *